US012749783B2

(12) United States Patent
Huang et al.

(10) Patent No.: US 12,749,783 B2
(45) Date of Patent: Sep. 29, 2026

(54) LIQUID INJECTION DEVICE

(71) Applicant: CONTEMPORARY AMPEREX TECHNOLOGY (HONG KONG) LIMITED, Hong Kong (CN)

(72) Inventors: Hu Huang, Ningde (CN); Shaobing Ge, Ningde (CN); Caixia Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/184,868

(22) Filed: Apr. 21, 2025

(65) Prior Publication Data

US 2025/0253509 A1 Aug. 7, 2025

Related U.S. Application Data

(63) Continuation of application No. PCT/CN2022/126820, filed on Oct. 21, 2022.

(51) Int. Cl.

| | |
|---|---|
| ***H01M 2/36*** | (2006.01) |
| ***B08B 1/14*** | (2024.01) |
| ***B08B 1/20*** | (2024.01) |
| ***H01M 50/609*** | (2021.01) |

(52) U.S. Cl.

CPC ........... *H01M 50/609* (2021.01); *B08B 1/143* (2024.01); *B08B 1/20* (2024.01)

(58) Field of Classification Search

CPC ......... B08B 1/143; B08B 1/20; H01M 50/609
See application file for complete search history.

(56) References Cited

U.S. PATENT DOCUMENTS

| | | | | |
|---|---|---|---|---|
| 11,325,383 | B2 * | 5/2022 | Kanazawa | B41J 2/16517 |
| 11,833,549 | B1 * | 12/2023 | Tan | H01M 50/691 |
| 11,845,283 | B2 * | 12/2023 | Yamaguchi | B41J 2/04566 |
| 2010/0201724 | A1 * | 8/2010 | Yamaguchi | B41J 2/52 347/30 |

(Continued)

FOREIGN PATENT DOCUMENTS

| | | |
|---|---|---|
| CN | 103199217 B | 6/2015 |
| CN | 106733760 A | 5/2017 |

(Continued)

OTHER PUBLICATIONS

Machine translation of JP4333215 (Year: 2009).*

(Continued)

*Primary Examiner* — Nicolas A Arnett
(74) *Attorney, Agent, or Firm* — ANOVA LAW GROUP, PLLC

(57) ABSTRACT

A liquid injection device includes a liquid injection assembly, a first driving mechanism, and a carrying mechanism. The liquid injection assembly includes a liquid injection body and a liquid injection head arranged on the body. The first driving mechanism is configured to drive the liquid injection assembly to move. The carrying mechanism is configured to carry a replaceable wiping member. The carrying mechanism cooperates with the first driving mechanism, so that the liquid injection head comes into contact with a different position on the replaceable wiping member, and then the liquid injection head is wiped.

14 Claims, 7 Drawing Sheets

(56) References Cited

U.S. PATENT DOCUMENTS

| | | | | |
|---|---|---|---|---|
| 2018/0326731 | A1* | 11/2018 | Fukasawa | B41J 2/16538 |
| 2019/0255854 | A1* | 8/2019 | Asano | B41J 2/16538 |

FOREIGN PATENT DOCUMENTS

| | | | | | |
|---|---|---|---|---|---|
| CN | 206422145 | U | | 8/2017 | |
| CN | 206931647 | U | | 1/2018 | |
| CN | 110813810 | A | | 2/2020 | |
| CN | 113328215 | A | | 8/2021 | |
| CN | 216354664 | U | | 4/2022 | |
| CN | 114713534 | A | | 7/2022 | |
| CN | 217158590 | U | | 8/2022 | |
| CN | 217562793 | U | | 10/2022 | |
| EP | 3530466 | A1 | | 8/2019 | |
| JP | H06114314 | A | | 4/1994 | |
| JP | H1110051 | A | | 1/1999 | |
| JP | 2004337770 | A | | 12/2004 | |
| JP | 3936904 | B2 | * | 6/2007 | B05C 5/02 |
| JP | 4333215 | B2 | * | 9/2009 | B05C 11/10 |
| JP | 6930206 | B2 | * | 9/2021 | B41J 2/16523 |
| JP | 2004122065 | A | | 4/2022 | |

OTHER PUBLICATIONS

The European Patent Office (EPO) The Extended European Search Report for Application No. 22962483.8 Nov. 18, 2025 76 Pages.

The World Intellectual Property Organization (WIPO) International Search Report for PCT/CN2022/126820 Jun. 13, 2023 8 Pages (including translation).

* cited by examiner

LIQUID INJECTION DEVICE

CROSS-REFERENCE TO RELATED APPLICATION

This application is a continuation of International Application No. PCT/CN2022/126820, filed on Oct. 21, 2022, the entire content of which is incorporated herein by reference.

TECHNICAL FIELD

This application relates to the field of liquid injection technologies, and in particular, to a liquid injection device.

BACKGROUND

As a power source for new energy vehicles, batteries have received great attention in the market. Therefore, the quality of the battery is an important guarantee for the long-term development of new energy vehicles. In a production process of the battery, a liquid injection device is needed to inject an electrolyte solution into the battery. After each injection is completed, the electrolyte solution remaining on a liquid injection head of the liquid injection device needs to be cleaned, to avoid an undesired impact on the subsequent processing of the battery.

Currently, a method for cleaning the liquid injection head of the liquid injection device is to wipe the liquid injection head by using a cleaning mouth. The cleaning mouth is usually repeatedly used. Therefore, after a previous cleaning process is completed, the electrolyte solution remains in the cleaning mouth, and causes contamination to the surface of the liquid injection head again in a next cleaning process. Consequently, the cleaning effect is poor, and cross-contamination may also be caused in a serious case, so the quality of the battery cannot be ensured in the production process. In addition, liquid injection devices used in other industries also have similar problems.

SUMMARY

In view of this, the technical problem mainly intended to be solved in this application is to provide a liquid injection device, to solve the problem of poor cleaning effect on a liquid injection head of the liquid injection device.

To solve the foregoing technical problem, this application provides a liquid injection device. The liquid injection device includes a liquid injection assembly, a first driving mechanism, and a carrying mechanism. The liquid injection assembly includes a liquid injection body and a liquid injection head arranged on the liquid injection body. The first driving mechanism is configured to drive the liquid injection assembly to move. The carrying mechanism is configured to carry a replaceable wiping member. The carrying mechanism cooperates with the first driving mechanism, so that the liquid injection head can come into contact with a different position on the replaceable wiping member, and then the liquid injection head is wiped.

In the technical solution according to the embodiments of this application, the carrying mechanism carries the replaceable wiping member, and further cooperates with the first driving mechanism, so that the liquid injection head can come into contact with a different position on the replaceable wiping member, and then the liquid injection head is wiped, to reduce the probability that the liquid injection head is repeatedly contaminated with the liquid injected, thereby effectively improving the cleaning effect, and reducing the probability of cross-contamination.

In some embodiments, the carrying mechanism and the first driving mechanism are configured so that each time the liquid injection head is wiped, the liquid injection head is in contact with a different position on the replaceable wiping member. Such a design can avoid repeated cleaning of the liquid injection head by the same position on the replaceable wiping member, thereby further improving the cleaning effect and reducing the probability of cross-contamination.

In some embodiments, the replaceable wiping member is a flexible piece, the carrying mechanism includes a supporting platform configured to support the replaceable wiping member, and the liquid injection head is in contact with an area of the replaceable wiping member supported by the supporting platform. In such a design, the supporting platform is used to provide a supporting force for the replaceable wiping member, to ensure the stable contact between the liquid injection head and the replaceable wiping member, and the cleaning effect on the liquid injection head is improved by using the flexibility of the replaceable wiping member.

In some embodiments, the carrying mechanism further includes a wiping member adjustment mechanism. The wiping member adjustment mechanism is configured to move the replaceable wiping member relative to the supporting platform, whereby the liquid injection head comes into contact with a different position in the area of the replaceable wiping member supported by the supporting platform. In such a design, the replaceable wiping member is moved to change the contact position between the liquid injection head and the replaceable wiping member, and the first driving mechanism only needs to ensure that the liquid injection head comes into contact with the replaceable wiping member, thereby simplifying the complexity in driving the liquid injection assembly by the first driving mechanism.

In some embodiments, the replaceable wiping member that has not been used for wiping the liquid injection head is arranged in a roll form, and the wiping member adjustment mechanism includes an unrolling mechanism and a rolling mechanism. The unrolling mechanism is configured to release the replaceable wiping member that has not been used for wiping the liquid injection head onto the supporting platform, and the rolling mechanism is configured to roll the replaceable wiping member that has been used for wiping the liquid injection head. Such a design facilitates the replacement and management of the replaceable wiping member, reduces the number of times the replaceable wiping member is replaced, and reduces the workload of an operation staff.

In some embodiments, the first driving mechanism is configured to drive the liquid injection assembly to move, so that the liquid injection head comes into contact with a different position in the area of the replaceable wiping member supported by the supporting platform. In such a design, the first driving mechanism is used to change the contact position between the liquid injection head and the replaceable wiping member, so that the hardware cost of the device is reduced.

In some embodiments, the carrying mechanism further includes a platform adjustment mechanism, and the platform adjustment mechanism is configured to enable, by driving the supporting platform and the replaceable wiping member supported by the supporting platform to move, the liquid injection head to come into contact with a different position in the area of the replaceable wiping member supported by the supporting platform. In such a design, the supporting platform is moved to change the contact position between the liquid injection head and the replaceable wiping member, and the first driving mechanism only needs to ensure that the liquid injection head comes into contact with the replaceable wiping member, thereby simplifying the driving process of the liquid injection assembly by the first driving mechanism.

In some embodiments, the liquid injection device further includes a second driving mechanism. The second driving mechanism is configured to drive one of the liquid injection head and the replaceable wiping member to rotate relative to the other after the liquid injection head is in contact with the replaceable wiping member. Such a design improves the cleaning effect on the liquid injection head by means of the friction formed during relative rotation between the liquid injection head and the replaceable wiping member.

In some embodiments, the liquid injection head is rotationally supported on the liquid injection body. The second driving mechanism drives the liquid injection head to rotate relative to the liquid injection body, and to rotate relative to the replaceable wiping member after the liquid injection head is in contact with the replaceable wiping member. Such a design can more effectively enable the relative rotation between the liquid injection head and the replaceable wiping member.

In some embodiments, the second driving mechanism is fixed to the liquid injection body, and the first driving mechanism drives the second driving mechanism and the liquid injection assembly to move synchronously. Such a design can effectively simplify the driving connection pattern between the second driving mechanism and the liquid injection head.

In some embodiments, a rotation axis of the liquid injection head is perpendicular to a supporting surface of the supporting platform. Such a design can further improve the cleaning effect on the liquid injection head during relative rotation between the liquid injection head and the replaceable wiping member.

In some embodiments, the liquid injection body includes a cup portion and an adapter portion that are connected to each other. The cup portion defines a liquid injection cavity. The adapter portion defines an accommodating cavity on a side of a bottom wall of the cup portion that faces away from the liquid injection cavity. The liquid injection assembly further includes an adapter column. The adapter column is rotationally supported in the accommodating cavity. The liquid injection head is disposed on an outer end surface of the adapter column that faces away from the liquid injection cavity and is disposed coaxially with the adapter column. The adapter column is provided with a liquid guiding channel. The bottom wall of the cup portion is provided with a liquid guiding hole in line with the liquid guiding channel. The liquid injection head is in communication with the accommodating cavity via the liquid guiding channel and the liquid guiding hole. Such a design can effectively ensure the connection and rotation stability between the liquid injection body and the liquid injection head.

In some embodiments, an end of the adapter column that faces away from the liquid injection cavity is exposed out of the accommodating cavity. The second driving mechanism is connected to an exposed portion of the adapter column, and drives the adapter column and the liquid injection head to rotate relative to the liquid injection body. Such a design can simplify a driving connection pattern between the second driving mechanism and the liquid injection head, and ensure the rotation stability of the liquid injection head.

In some embodiments, the second driving mechanism includes a motor and a transmission belt. A motor body of the motor is fixed to the liquid injection body. The transmission belt is disposed around an outer peripheral surface of an output shaft of the motor and an outer peripheral surface of the exposed portion of the adapter column. A rotation axis of the output shaft of the motor is parallel to a rotation axis of the liquid injection head and the adapter column. Such a design can simplify the driving connection pattern between the second driving mechanism and the liquid injection head, and ensure the rotation stability of the liquid injection head.

In some embodiments, the liquid injection device further includes a bearing and a sealing member located in the accommodating cavity. The bearing is configured to rotationally support the adapter column, and the sealing member is configured to form a sealing connection between the adapter column and the liquid injection body. In such a design, the connection reliability and sealing performance between the adapter column and the liquid injection body are ensured by the bearing and the sealing member disposed in the accommodating cavity.

In some embodiments, a recess adapted in shape to the liquid injection head is provided on the supporting surface of the supporting platform. The first driving mechanism further presses the liquid injection head and the replaceable wiping member that is in contact with the liquid injection head into the recess, after the liquid injection head comes into contact with the replaceable wiping member. In such a design, the recess adapted in shape to the liquid injection head is provided on the supporting surface of the supporting platform, so that the replaceable wiping member wraps the peripheral surface of the liquid injection head, thereby further improving the cleaning effect.

The above description is merely summary of the technical solutions of this application. For better understanding of the technical means provided in this application, the technical means can be implemented according to the disclosure in the specification. Furthermore, to make the above and other objectives, features and advantages of this application more comprehensible, specific implementations of this application are exemplified below.

BRIEF DESCRIPTION OF THE DRAWINGS

To describe the technical solutions in the embodiments of this application more clearly, the accompanying drawings required for describing the embodiments of this application will be described briefly below. Apparently, the accompanying drawings described below show only some embodiments of this application, and other drawings can be obtained by a person of ordinary skill in the art from the accompanying drawings without creative efforts.

Figure 1:
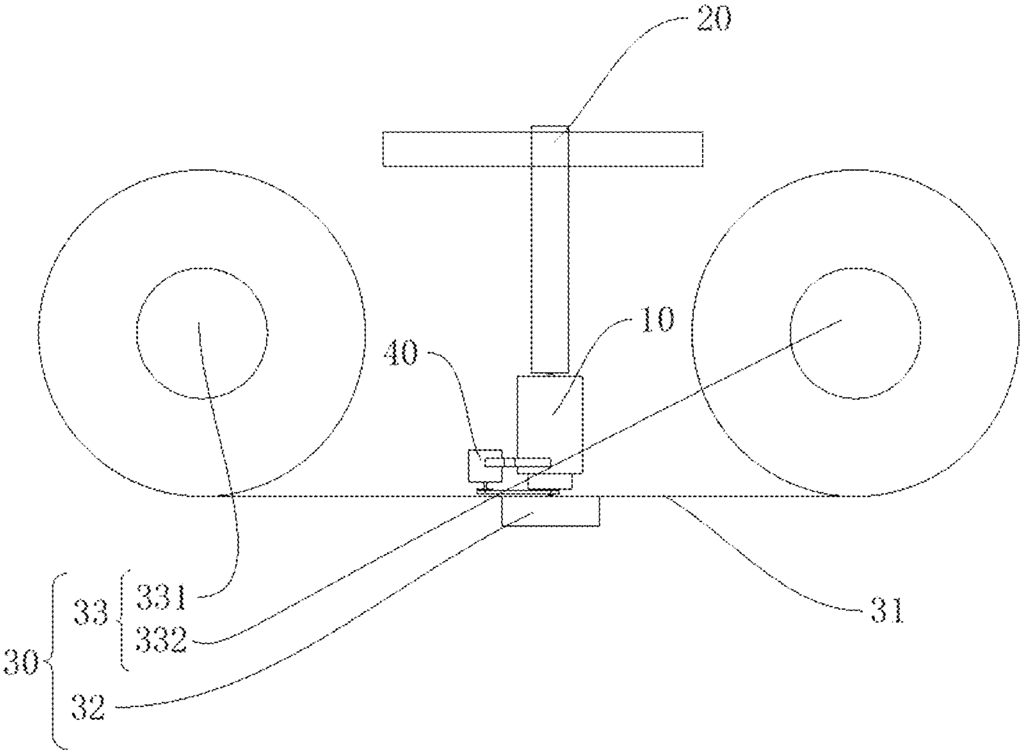
FIG. 1 is a front view of a liquid injection device disclosed in an embodiment of this application.

In the drawings, the drawings are not drawn in an actual proportion.

DESCRIPTION OF REFERENCE NUMERALS

10 liquid injection assembly; 11 liquid injection body; 12 liquid injection head; 13 adapter column; 111 cup portion; 112 adapter portion; 113 liquid injection cavity; 114 accommodating cavity; 115 bearing; 116 sealing member; 131 liquid guiding channel; 132 liquid guiding hole;

20 first driving mechanism;

30 carrying mechanism; 31 replaceable wiping member; 32 supporting platform; 33 wiping member adjustment mechanism; 34 platform adjustment mechanism; 321 supporting surface; 322 recess; 331 unrolling mechanism; 332 rolling mechanism;

40 second driving mechanism; 41 motor; 42 transmission belt; 43 connecting member.

DETAILED DESCRIPTION

The implementations of this application will be described in further detail with reference to the accompanying drawings and embodiments. The following detailed description of the embodiments and the accompanying drawings are used to exemplarily describe the principle of this application, but not intended to limit the scope of this application. That is, this application is not limited to the described embodiments.

In the description of this application, it should be noted that unless otherwise indicated, "a plurality of" means two or more; and directions or location relationships indicated by the terms "upper", "lower", "left", "right", "inner", and "outer" are merely used for the convenience of describing this application and simplifying the description, but are not intended to indicate or imply that a device or an element indicated must have a particular direction or must be constructed and operated in a particular direction, and therefore, cannot be understood as a limitation to this application. Moreover, the terms "first", "second", "third" and the like are used for descriptive purposes only and are not to be construed as indicating or implying relative importance. The "vertical" is not vertical in a strict sense, but within an error allowance range. The "parallel" is not parallel in a strict sense, but within an error allowance range.

The directional words appearing in the following description are all the directions shown in the figure, and are not intended to limit the specific structure in this application. In the description of this application, it should be further noted that unless otherwise explicitly specified or defined, the terms such as "mount", "install", "connect", and "connection" should be understood in a broad sense. For example, the connection may be a fixed connection, a detachable connection, or an integral connection; or the connection may be a direct connection, or an indirect connection through an intermediary. For those of ordinary skill in the art, the specific meanings of the above terms in this application can be understood according to specific situations.

Currently, considering the development prospect and application trend in the market, the battery has been widely used in various fields due to advantages such as high energy density, high power density, large number of times of reuse, and long storage time. For example, the battery is used in energy storage power systems such as water power plant, fire power plant, wind power plant and solar power plant, provides power to high-power devices such as electric bicycles, electric motorcycles, electric automobiles, and other electric vehicles, and is also used in military equipment, aerospace and other fields. With the constant broadening of the application fields of the battery, the requirements raised for the battery are also becoming increasingly high.

The inventor of this application notes that in the production process of the battery, after a liquid injection device injects an electrolyte solution into a battery cell, a liquid injection head of the liquid injection device is cleaned by using a cleaning mouth. Because the cleaning mouth is repeatedly used, the cleaning mouth inevitably carries the electrolyte solution after cleaning the liquid injection head, and passes the electrolyte solution to a liquid injection head to be cleaned in a next cleaning process. Consequently, the cleaning effect is poor, and even cross-contamination is caused, affecting the battery production rate.

To solve the foregoing problem caused by repeated cleaning, the inventor finds through research that a replaceable wiping member can be designed. Specifically, a replaceable wiping member is placed between the liquid injection head and a carrying mechanism. The liquid injection head is enabled to come into contact with a different position on the replaceable wiping member by means of the cooperation between the carrying mechanism and a driving mechanism, and then the liquid injection head is wiped, thereby improving the cleaning effect and avoiding cross-contamination.

After further research, the inventor further designs a rotationable liquid injection head. The liquid injection head self-rotates on the surface of the replaceable wiping member, so that the surface of the liquid injection head can be cleaned more effectively.

The liquid injection device disclosed in the embodiments of this application may be, without limitation, used for injecting an electrolyte solution into a battery, and is also applicable to another industry in which residual liquid on a liquid injection head needs to be cleaned.

For ease of description, the following embodiments are described by using a liquid injection device that is used for injecting an electrolyte solution into a battery according to an embodiment of this application as an example.

Figure 2:
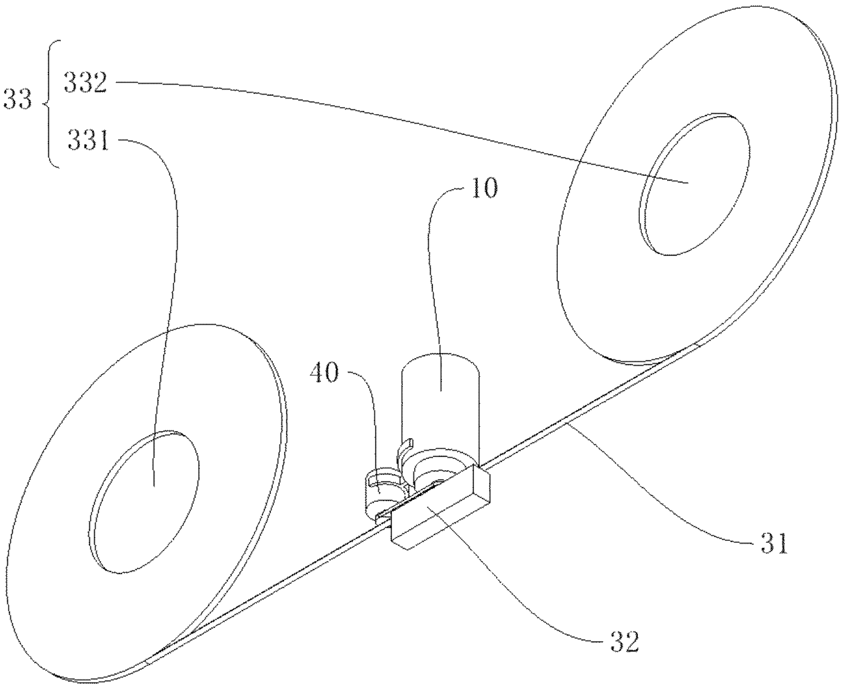
FIG. 2 is a schematic perspective view of the liquid injection device shown in FIG. 1 from which a first driving mechanism is removed.
Figure 3:
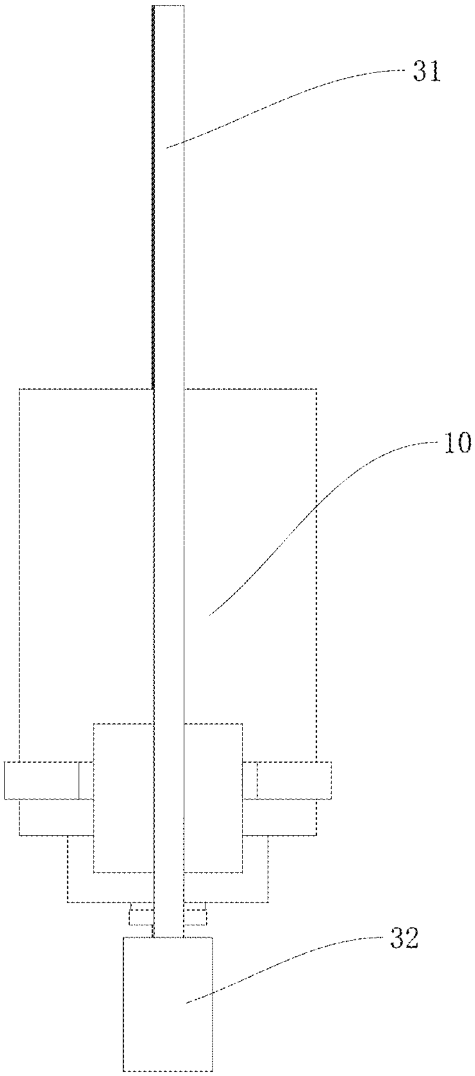
FIG. 3 is a left view of the liquid injection device shown in FIG. 1 from which the first driving mechanism is removed.
Figure 4:
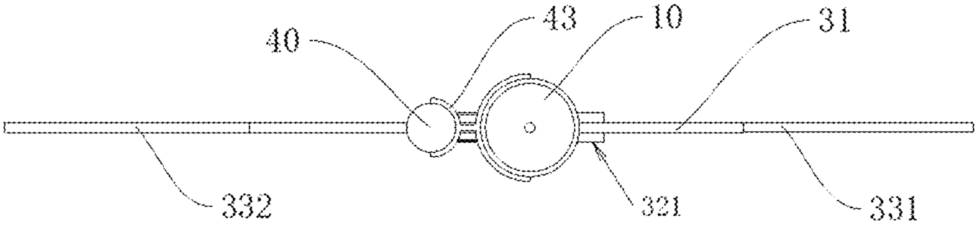
FIG. 4 is a top view of the liquid injection device shown in FIG. 1 from which the first driving mechanism is removed.
Figure 5:
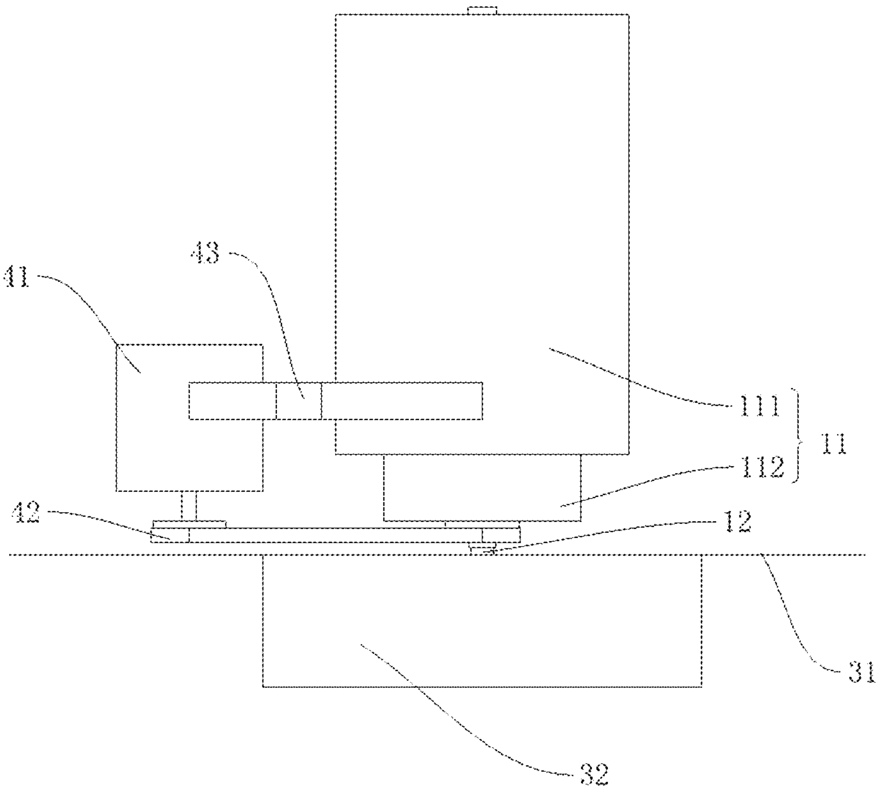
FIG. 5 is a front view of a liquid injection assembly and a second driving mechanism in a liquid injection device disclosed in an embodiment of this application.

According to some embodiments of this application, referring to FIGS. 1 to 4, FIG. 1 is a front view of a liquid injection device according to some embodiments of this application. FIGS. 2 to 4 are respectively a perspective view, a left view, and a top view of the liquid injection device shown in FIG. 1 from which a first driving mechanism 20 is removed. An embodiment of this application provides a liquid injection device. The liquid injection device includes a liquid injection assembly 10, a first driving mechanism 20, and a carrying mechanism 30. Further, as shown in FIG. 5, the liquid injection assembly 10 includes a liquid injection body 11 and a liquid injection head 12 arranged on the liquid injection body 11. The first driving mechanism 20 is configured to drive the liquid injection assembly 10 to move. The carrying mechanism 30 is configured to carry a replaceable wiping member 31. The carrying mechanism 30 cooperates with the first driving mechanism 20, so that the liquid injection head 12 can come into contact with a different position on the replaceable wiping member 31, and then the liquid injection head 12 is wiped.

In this embodiment, the liquid injection assembly 10 includes the liquid injection body 11 and the liquid injection head 12. The liquid injection body 11 is connected to the liquid injection head 12. The liquid injection body 11 stores a liquid or a fluid, and the liquid injection head 12 injects the liquid or fluid into an intended container. A scenario where an electrolyte solution is injected into a battery is used as an example. For example, the liquid injection head 12 is driven by the first driving mechanism 20 to be aligned with a liquid injection port of the battery located at a liquid injection position, and injects the electrolyte solution into the battery through the liquid injection port of the battery. After the liquid injection is completed, the first driving mechanism 20 drives the liquid injection head 12 to leave the liquid injection position and move to a cleaning position. In the above scenario, the carrying mechanism 30 may be arranged at the cleaning position, so as to cooperate with the first driving mechanism 20 to complete the cleaning of the liquid injection head 12. In another scenario, the first driving mechanism 20 may be configured to implement other functions.

In this embodiment, the first driving mechanism 20 may be various driving mechanisms well known in the art, such as a translation mechanism and a rotary mechanism. A specific driving mode thereof may be mechanical driving, such as gear driving, worm-wormwheel driving, belt driving, and chain driving, or electrical driving, pneumatic driving, or hydraulic driving, which is not limited herein. In this embodiment, the first driving mechanism 20 may further be detachably connected to the liquid injection body 11 of the liquid injection assembly 10 by, for example, magnetic attraction connection or threaded connection, so that a different liquid injection assembly 10 may be used according to a different liquid injection requirement.

The carrying mechanism 30 carries the replaceable wiping member 31, that is, the replaceable wiping member 31 is located between the liquid injection head 12 and the carrying mechanism 30. The carrying mechanism 30 cooperates with the first driving mechanism 20, so that the liquid injection head 12 can come into contact with a different position on the replaceable wiping member 31. A specific cooperation pattern may be enabled in various implementations. For example, the replaceable wiping member 31 carried by the carrying mechanism 30 is stationary, and the first driving mechanism 20 drives the liquid injection head 12 to move to a different position on the replaceable wiping member 31. Alternatively, the liquid injection head 12 may be stationary, and the replaceable wiping member 31 carried by the carrying mechanism 30 moves relative to the liquid injection head 12 after wiping the liquid injection head 12.

In the above technical solution, the carrying mechanism 30 cooperates with the first driving mechanism 20, so that the liquid injection head 12 can come into contact with a different position on the replaceable wiping member 31, thereby reducing the probability that the liquid injection head 12 is repeatedly contaminated with the injected liquid, effectively improving the cleaning effect, reducing the probability of cross-contamination, and ensuring the battery quality in the production process.

According to some embodiments of this application, optionally, the carrying mechanism 30 and the first driving mechanism 20 are configured so that each time the liquid injection head 12 is wiped, the liquid injection head 12 is in contact with a different position on the replaceable wiping member 31.

Because the liquid injection head 12 is in contact with a different position on the replaceable wiping member 31 at each time, so the position of contact is the replaceable wiping member 31 that has not been used to wipe the liquid injection head 12, whereby repeated cleaning of the liquid injection head 12 by the same position on the replaceable wiping member 31 is avoided, thereby further improving the cleaning effect and reducing the probability of cross-contamination.

According to some embodiments of this application, optionally, the replaceable wiping member 31 is a flexible piece, the carrying mechanism 30 includes a supporting platform 32 configured to support the replaceable wiping member 31, and the liquid injection head 12 is in contact with an area of the replaceable wiping member 31 supported by the supporting platform 32. Specifically, the replaceable wiping member 31 may be, but is not limited to, a piece of material having good absorption, such as non-woven fabric, nylon fabric, sponge, absorbent paper, or a cotton material. The replaceable wiping member 31 has high liquid absorptivity, can store a large amount of solvent, is strong and durable, and has low costs.

The liquid injection head 12 is moved by the first driving mechanism 20 to come into contact with the replaceable wiping member 31 supported by the supporting platform 32. The supporting platform 32 provides a supporting force for the replaceable wiping member 31, to ensure the stable contact between the liquid injection head 12 and the replaceable wiping member 31, and improve the cleaning effect on the liquid injection head 12 by using the flexibility of the replaceable wiping member 31.

According to some embodiments of this application, optionally, the carrying mechanism 30 further includes a wiping member adjustment mechanism 33, and the wiping member adjustment mechanism 33 is configured to move the replaceable wiping member 31 relative to the supporting platform 32, whereby the liquid injection head 12 comes into contact with a different position in the area of the replaceable wiping member 31 supported by the supporting platform 32.

In a specific implementation, the supporting platform 32 is stationary, and the replaceable wiping member 31 is driven to move by the wiping member adjustment mechanism 33. In this case, the first driving mechanism 20 drives the liquid injection head 12 to come into contact with and be wiped by the replaceable wiping member 31 carried by the supporting platform 32. After the cleaning is completed, the liquid injection head 12 leaves the supporting platform 32, and the wiping member adjustment mechanism 33 moves the replaceable wiping member 31 carried by the supporting platform 32. Further, when the first driving mechanism 20 drives the liquid injection head 12 again to come into contact with the replaceable wiping member 31 supported by the supporting platform 32, the replaceable wiping member 31 in contact therewith has not been used to wipe the liquid injection head 12.

As described above, the first driving mechanism 20 needs to drive the liquid injection head 12 to complete multiple actions including liquid injection and cleaning. More action processes lead to higher complexity of the control procedure and a higher control precision requirement; otherwise, the accumulated error will become larger. Therefore, in the foregoing embodiments, the replaceable wiping member 31 is moved by the wiping member adjustment mechanism 33 to change the contact position between the liquid injection head 12 and the replaceable wiping member 31, and the first driving mechanism 20 only needs to ensure that the liquid injection head 12 comes into contact with the replaceable wiping member 31, thereby simplifying the complexity in driving the liquid injection assembly 10 by the first driving mechanism 20 and simplifying the control difficulty.

According to some embodiments of this application, optionally, still referring to FIG. 1 to FIG. 4, the replaceable wiping member 31 that has not been used for wiping the liquid injection head 12 is arranged in a roll form, and the wiping member adjustment mechanism 33 includes an unrolling mechanism 331 and a rolling mechanism 332. The unrolling mechanism 331 is configured to release the replaceable wiping member 31 that has not been used for wiping the liquid injection head 12 onto the supporting platform 32, and the rolling mechanism 332 is configured to roll the replaceable wiping member 31 that has been used for wiping the liquid injection head 12.

In this embodiment, the unrolling mechanism 331 and the rolling mechanism 332 are respectively rotationally mounted at two sides of the supporting platform 32. In other embodiments, specific positions of the unrolling mechanism 331 and the rolling mechanism 332 are not limited, and may be set according to needs. In a specific implementation, the unrolling mechanism 331 is a non-power roller having a certain rotational damping, and the unrolling mechanism 332 is a power roller. In this case, the replaceable wiping member 31 that has not been used to wipe the liquid injection head 12 is disposed around the unrolling mechanism 331, and the replaceable wiping member 31 is in a tightened state between the unrolling mechanism 331 and the rolling mechanism 332. The rolling mechanism 332 is driven to rotate, so that the replaceable wiping member 31 that has been used to wipe the liquid injection head 12 is rolled onto the rolling mechanism 332, and the unrolling mechanism 331 is driven to release the replaceable wiping member 31 that has not been used to wipe the liquid injection head 12 onto the supporting platform 32. In other specific implementations, the unrolling mechanism 331 and the unrolling mechanism 332 may both be a power roller. The movement of the unrolling mechanism 332 and the unrolling mechanism 331 may be driven mechanically, hydraulically, or pneumatically, or by a motor 41, which is not limited herein.

By means of the unrolling action and the unrolling action of the unrolling mechanism 331 and the rolling mechanism 332, it is ensured that the liquid injection head 12 is in contact with the replaceable wiping member 31 that has not been used to wipe the liquid injection head 12 at each time, and it is convenient to replace and manage the replaceable wiping member 31, thereby reducing the number of times the replaceable wiping member 31 is replaced and reducing the workload of an operation personnel.

According to some embodiments of this application, optionally, the first driving mechanism 20 is configured to drive the liquid injection assembly 10 to move, so that the liquid injection head 12 comes into contact with a different position in the area of the replaceable wiping member 31 supported by the supporting platform 32.

In a specific implementation, the supporting platform 32 carries the replaceable wiping member 31, where the replaceable wiping member 31 is fixed to the supporting platform 32, and multiple different marked positions are marked on the replaceable wiping member 31. Then, for teaching in a dragging manner, the first driving mechanism 20 is dragged to allow the liquid injection head 12 to come into contact with a different marked position, and a travel path of the first driving mechanism 20 is recorded by using a motion sensor on the first driving mechanism 20. During practical operation, when the first driving mechanism 20 drives the liquid injection assembly 10 that has completed the liquid injection action to move to the supporting platform 32, the liquid injection head 12 can be enabled to come into contact with a different position on the replaceable wiping member 31 by selecting a different pre-recorded travel path. In other specific implementations, the travel path can be planned for the first driving mechanism 20 by other methods well known in the art. The first driving mechanism 20 is used to change the contact position between the liquid injection head 12 and the replaceable wiping member 31, without introducing other driving components, thereby reducing the hardware cost of the device.

According to some embodiments of this application, optionally, the liquid injection device further includes a second driving mechanism 40. The second driving mechanism 40 is configured to drive one of the liquid injection head 12 and the replaceable wiping member 31 to rotate relative to the other after the liquid injection head 12 is in contact with the replaceable wiping member 31.

A driving mode of the second driving mechanism 40 may be mechanical driving, such as gear driving, worm-worm-wheel driving, belt driving, and chain driving, or electrical driving, pneumatic driving, or hydraulic driving, which is not limited herein.

In this embodiment, when the liquid injection head 12 is in contact with the replaceable wiping member 31, the second driving mechanism 40 drives the liquid injection head 12 to rotate, so that the cleaning effect on the liquid injection head 12 is improved by means of the friction formed during relative rotation between the liquid injection head 12 and the replaceable wiping member 31.

Figure 6:
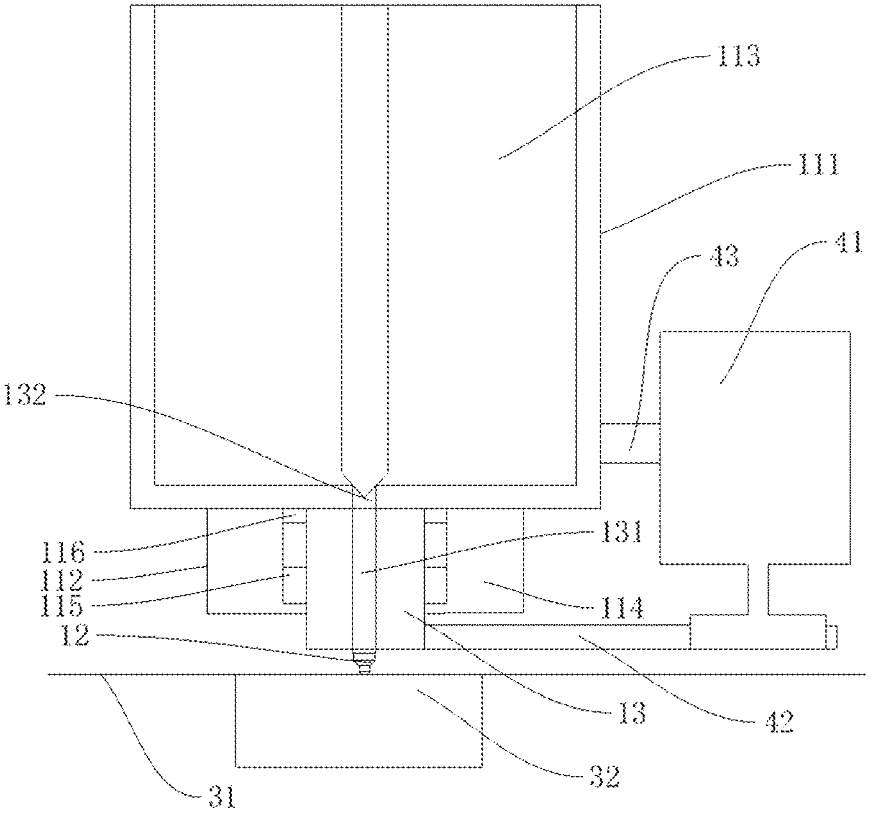
FIG. 6 is a cross-sectional view of a liquid injection assembly and a second driving mechanism in a liquid injection device disclosed in an embodiment of this application.

According to some embodiments of this application, optionally, referring to FIG. 5 and FIG. 6, FIG. 5 and FIG. 6 are respectively a front view and a cross-sectional view of a liquid injection assembly and a second driving mechanism in a liquid injection device according to some embodiments of this application. The liquid injection head 12 is rotationally supported on the liquid injection body 11. The second driving mechanism 40 drives the liquid injection head 12 to rotate relative to the liquid injection body 11, and to rotate relative to the replaceable wiping member 31 after the liquid injection head 12 is in contact with the replaceable wiping member 31.

The liquid injection body 11 and the liquid injection head 12 are provided as two relatively separate parts, and the liquid injection body 11 supports the liquid injection head 12 to rotate, so that relative rotation between the liquid injection head 12 and the replaceable wiping member 31 is achieved more effectively in a relatively simple manner.

According to some embodiments of this application, optionally, the second driving mechanism 40 is fixed to the liquid injection body 11, and the first driving mechanism 20 drives the second driving mechanism 40 and the liquid injection assembly 10 to move synchronously.

In a specific implementation, the second driving mechanism 40 is fixedly connected to the liquid injection body 11. A specific connection pattern may be direct connection, or indirect connection. The direct connection may be mechanical connection, welded connection, or bonded connection. The indirect connection may be connection of the second driving mechanism 40 to the liquid injection body 11 by a connection piece 43, so that they remain fixed relative to each other. This is not limited herein.

In this case, the second driving mechanism 40 and the liquid injection assembly 10 can synchronously move, and a normal driving connection can be maintained between the second driving mechanism 40 and the liquid injection head 12, thereby effectively simplifying a driving connection pattern between the second driving mechanism 40 and the liquid injection head 12.

According to some embodiments of this application, optionally, a rotation axis of the liquid injection head 12 is perpendicular to a supporting surface 321 of the supporting platform 32. In a specific implementation, the supporting surface 321 of the supporting platform 32 is horizontal, and the replaceable wiping member 31 is horizontally placed on the supporting surface 321.

Because the rotation axis of the liquid injection head 12 is perpendicular to the supporting surface 321, the liquid injection head 12 can form uniform contact with the replaceable wiping member 31 during rotation, thereby further improving the cleaning effect on the liquid injection head 12 during relative rotation between the liquid injection head 12 and the replaceable wiping member 31, and avoiding unnecessary wear of the liquid injection head 12.

According to some embodiments of this application, optionally, referring to FIG. 6, the liquid injection body 11 includes a cup portion 111 and an adapter portion 112 that are connected to each other. The cup portion 111 defines a liquid injection cavity 113. The adapter portion 112 defines an accommodating cavity 114 on a side of a bottom wall of the cup portion 111 that faces away from the liquid injection cavity 113. The liquid injection assembly 10 further includes an adapter column 13. The adapter column 13 is rotationally supported in the accommodating cavity 114. The liquid injection head 12 is disposed on an outer end surface of the adapter column 13 that faces away from the liquid injection cavity 113 and is disposed coaxially with the adapter column 13. The adapter column 13 is provided with a liquid guiding channel 131. The bottom wall of the cup portion 111 is provided with a liquid guiding hole 132 in line with the liquid guiding channel 131. The liquid injection head 12 is in communication with the accommodating cavity 114 via the liquid guiding channel 131 and the liquid guiding hole 132.

In the above manner, the adapter portion 112 is further disposed on the liquid injection body 11, and the rotation between the liquid injection head 12 and the liquid injection body 11 is enabled by using the adapter column 13 that extends into the accommodating cavity 114 of the adapter portion 112, so that the connection and rotation stability between the liquid injection body 11 and the liquid injection head 12 can be effectively ensured.

According to some embodiments of this application, optionally, an end of the adapter column 13 that faces away from the liquid injection cavity 113 is exposed out of the accommodating cavity 114. The second driving mechanism 40 is connected to an exposed portion of the adapter column 13, and drives the adapter column 13 and the liquid injection head 12 to rotate relative to the liquid injection body 11.

The liquid injection head 12 generally has a special-shaped structure and a relatively poor structural strength. Therefore, if the second driving mechanism 40 is directly in driving connection to the liquid injection head 12, a relatively complex connection pattern is needed, and the structural stability is relatively poor. In the above manner, the second driving mechanism 40 is in driving connection with the exposed portion of the adapter column 13, and the adapter column 13 drives the liquid injection head 12 to rotate, so that the driving connection pattern between the second driving mechanism 40 and the liquid injection head 12 is effectively simplified, and the rotation stability of the liquid injection head 12 is ensured. Further, when the liquid injection head 12 is damaged, only the liquid injection head 12 needs to be replaced, and the entire liquid injection assembly 10 does not need to be detached.

According to some embodiments of this application, optionally, referring to FIG. 5 and FIG. 6, the second driving mechanism 40 includes a motor 41 and a transmission belt 42. A motor body of the motor 41 is fixed to the liquid injection body 11. The transmission belt 42 is disposed around an outer peripheral surface of an output shaft of the motor 41 and an outer peripheral surface of the exposed portion of the adapter column 13. A rotation axis of the output shaft of the motor 41 is parallel to a rotation axis of the liquid injection head 12 and the adapter column 13.

In the above manner, the cylindrical feature of the adapter column 13 is used, and the liquid injection head 12 and the adapter column 13 are driven in a relatively simple belt transmission manner, so as to further simplify the driving connection pattern between the second driving mechanism 40 and the liquid injection head 12, and ensure the rotation stability of the liquid injection head 12.

According to some embodiments of this application, optionally, referring to FIG. 6, the liquid injection device further includes a bearing 115 and a sealing member 116 that are located in the accommodating cavity 114. The bearing 115 is configured to rotationally support the adapter column 13, and the sealing member 116 is configured to form a sealing connection between the adapter column 13 and the liquid injection body 11.

The sealing member 116 is disposed between an outer side of the adapter column 13 and the cup portion 111 of the liquid injection body 11, to prevent the liquid in the liquid injection cavity 113 from overflowing to the accommodating cavity 114 and reduce the friction against the bottom wall of the cup portion 111 caused by rotation of the adapter column 13. In addition, the bearing 115 is disposed at an outer side of the adapter column 13, to support the adapter column 13 to rotate, and reduce the friction in the rotation process of the adapter column 13. In addition, because the sealing member 116 and the bearing 115 are disposed in the accommodating cavity 114, the sealing 116 and the bearing 115 can be effectively protected, to avoid the entering of dust and damage from an external force.

Figure 7:
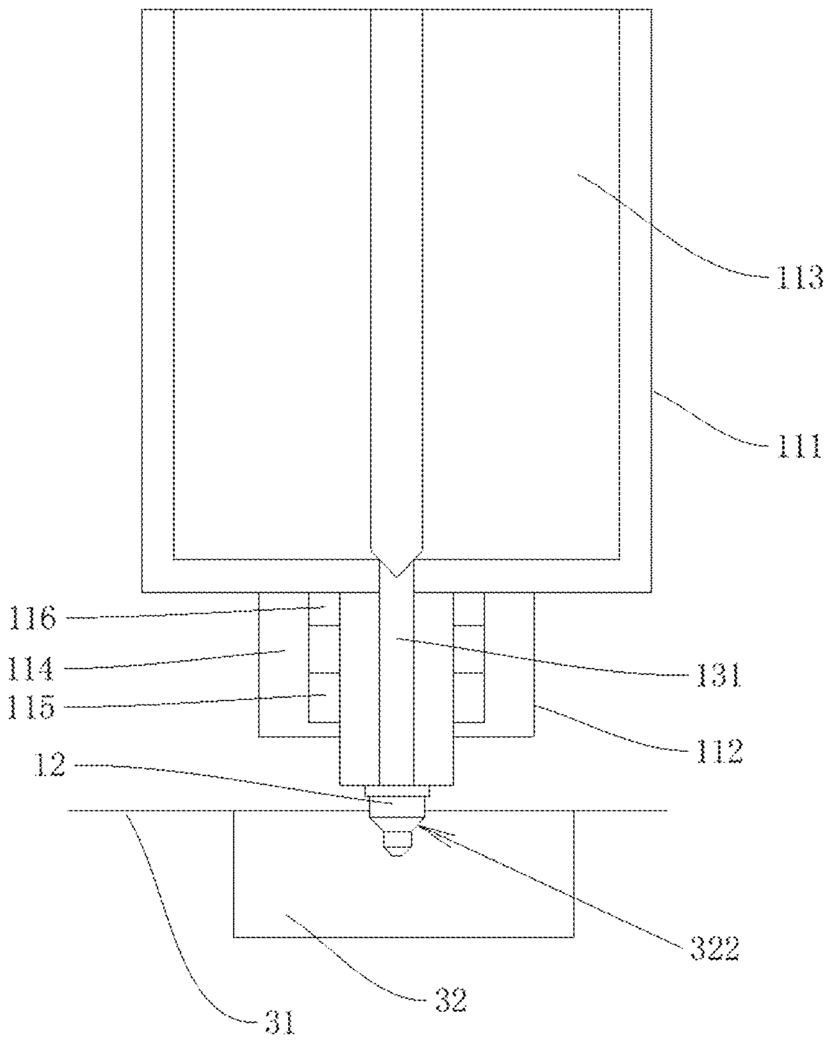
FIG. 7 is a cross-sectional view of a liquid injection head sunk in a supporting platform in a liquid injection device disclosed in an embodiment of this application.

According to some embodiments of this application, optionally, referring to FIG. 7, FIG. 7 is a cross-sectional view of a liquid injection head 12 sunk in a supporting platform 32 in a liquid injection device according to some embodiments of this application. A recess 322 adapted in shape to the liquid injection head 12 is provided on the supporting surface 321 of the supporting platform 32. The first driving mechanism 20 further presses the liquid injection head 12 and the replaceable wiping member 31 that is in contact with the liquid injection head 12 into the recess 322, after the liquid injection head 12 comes into contact with the replaceable wiping member 31.

In an implementation, the supporting platform 32 is a metal article. The supporting surface 321 has a preset recess 322 adapted to the liquid injection head 12. After driving the liquid injection head 12 to come into contact with the replaceable wiping member 31, the first driving mechanism 20 presses the liquid injection head 12 and the replaceable wiping member 31 that is in contact with the liquid injection head 12 into the recess 322 on the supporting platform 32, and then the replaceable wiping member 31 wipes the liquid injection head 12.

By arranging the recess 322 adapted in shape to the liquid injection head 12 on the supporting surface 321 of the supporting platform 32, the replaceable wiping member 31 wraps the peripheral surface of the liquid injection head 12, thereby further improving the cleaning effect on the liquid injection head 12.

Figure 8:
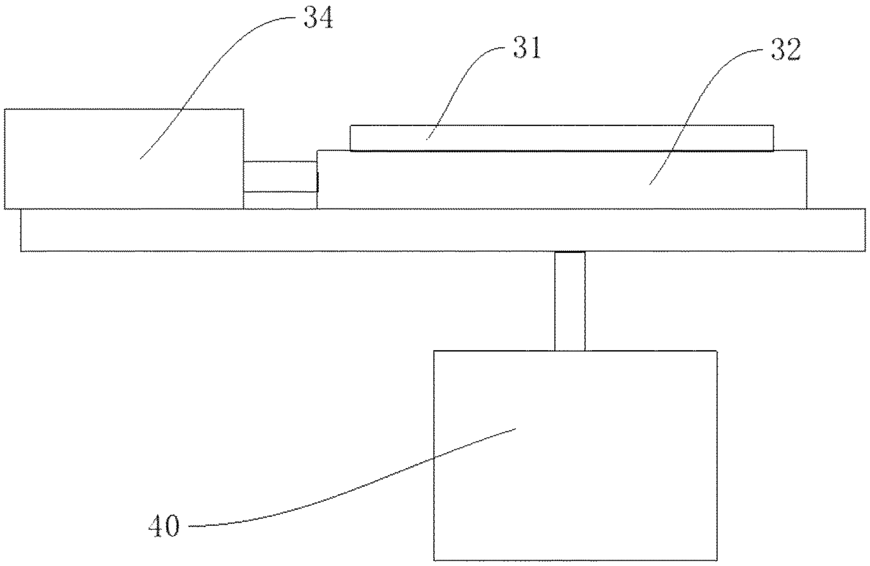
FIG. 8 is a front view of a liquid injection device disclosed in an embodiment of this application.

According to some embodiments of this application, optionally, the change in the contact position and the relative rotation between the replaceable wiping member 31 and the liquid injection head 12 may be enabled in other manners. For example, referring to FIG. 8, FIG. 8 is a front view of a platform adjustment mechanism 34 used in a liquid injection device according to some embodiments of this application. In this embodiment, the carrying mechanism 30 further includes a platform adjustment mechanism 34, and the platform adjustment mechanism 34 is configured to enable, by driving the supporting platform 32 and the replaceable wiping member 31 supported by the supporting platform 32 to move, the liquid injection head 12 to come into contact with a different position in the area of the replaceable wiping member 31 supported by the supporting platform 32.

Further, the second driving mechanism 40 is configured to drive the platform adjustment mechanism 34 and the supporting platform 32 to rotate after the liquid injection head 12 is in contact with the replaceable wiping member 31, so as to enable the relative rotation between the liquid injection head 12 and the replaceable wiping member 31.

Although this application has been described with reference to some embodiments, various improvements can be made thereto and components thereof can be replaced with equivalents without departing from the scope of this application. In particular, the technical features mentioned in the various embodiments can be combined in any manner as long as there is no structural conflict. This application is not limited to the specific embodiments disclosed herein, but rather includes all technical solutions falling within the scope of the claims.

What is claimed is:

1. A liquid injection device, comprising:

a liquid injection assembly, the liquid injection assembly comprising a liquid injection body and a liquid injection head arranged on the liquid injection body;

a first driving mechanism, configured to drive the liquid injection assembly to move;

a carrying mechanism, configured to carry a replaceable wiping member, the carrying mechanism cooperating with the first driving mechanism, so that the liquid injection head comes into contact with a different position on the replaceable wiping member, and then the liquid injection head is wiped; and a second driving mechanism, the second driving mechanism being configured to drive one of the liquid injection head and the replaceable wiping member to rotate relative to the other after the liquid injection head is in contact with the replaceable wiping member;

wherein:

the liquid injection body comprises a cup portion and an adapter portion that are connected to each other; the cup portion defines a liquid injection cavity, and the adapter portion defines an accommodating cavity on a side of a bottom wall of the cup portion that faces away from the liquid injection cavity;

the liquid injection assembly further comprises an adapter column rotationally supported in the accommodating cavity;

the liquid injection head is disposed on an outer end surface of the adapter column that faces away from the liquid injection cavity and is disposed coaxially with the adapter column;

the adapter column is provided with a liquid guiding channel;

the bottom wall of the cup portion is provided with a liquid guiding hole in line with the liquid guiding channel; and the liquid injection head is in communication with the accommodating cavity via the liquid guiding channel and the liquid guiding hole.

2. The liquid injection device according to claim 1, wherein the carrying mechanism and the first driving mechanism are configured so that each time the liquid injection head is wiped, the liquid injection head is in contact with a different position on the replaceable wiping member.

3. The liquid injection device according to claim 1, wherein the replaceable wiping member is a flexible piece, the carrying mechanism comprises a supporting platform configured to support the replaceable wiping member, and the liquid injection head is in contact with an area of the replaceable wiping member supported by the supporting platform.

4. The liquid injection device according to claim 3, wherein the carrying mechanism further comprises a wiping member adjustment mechanism, and the wiping member adjustment mechanism is configured to move the replaceable wiping member relative to the supporting platform, whereby the liquid injection head comes into contact with a different position in the area of the replaceable wiping member supported by the supporting platform.

5. The liquid injection device according to claim 4, wherein the replaceable wiping member that has not been used for wiping the liquid injection head is arranged in a roll form, the wiping member adjustment mechanism comprises an unrolling mechanism and a rolling mechanism, the unrolling mechanism is configured to release the replaceable wiping member that has not been used for wiping the liquid injection head onto the supporting platform, and the rolling mechanism is configured to roll the replaceable wiping member that has been used for wiping the liquid injection head.

6. The liquid injection device according to claim 3, wherein the first driving mechanism is configured to drive the liquid injection assembly to move, so that the liquid injection head comes into contact with a different position in the area of the replaceable wiping member supported by the supporting platform.

7. The liquid injection device according to claim 3, wherein the carrying mechanism further comprises a platform adjustment mechanism, and the platform adjustment mechanism is configured to drive the supporting platform and the replaceable wiping member supported by the supporting platform to move, whereby the liquid injection head comes into contact with a different position in the area of the replaceable wiping member supported by the supporting platform.

8. The liquid injection device according to claim 3, wherein:

a recess adapted in shape to the liquid injection head is provided on a supporting surface of the supporting platform; and the first driving mechanism further presses the liquid injection head and the replaceable wiping member that is in contact with the liquid injection head into the recess, after the liquid injection head is in contact with the replaceable wiping member.

9. The liquid injection device according to claim 3, wherein a rotation axis of the liquid injection head is perpendicular to a supporting surface of the supporting platform.

10. The liquid injection device according to claim 1, wherein the liquid injection head is rotationally supported on the liquid injection body, and the second driving mechanism drives the liquid injection head to rotate relative to the liquid injection body, and to rotate relative to the replaceable wiping member after the liquid injection head is in contact with the replaceable wiping member.

11. The liquid injection device according to claim 10, wherein the second driving mechanism is fixed to the liquid injection body, and the first driving mechanism drives the second driving mechanism and the liquid injection assembly to move synchronously.

12. The liquid injection device according to claim 1, wherein:

an end of the adapter column that faces away from the liquid injection cavity is exposed out of the accommodating cavity; and the second driving mechanism is connected to an exposed portion of the adapter column, and drives the adapter column and the liquid injection head to rotate relative to the liquid injection body.

13. The liquid injection device according to claim 12, wherein:

the second driving mechanism comprises a motor and a transmission belt;

a motor body of the motor is fixed to the liquid injection body;

the transmission belt is disposed around an outer peripheral surface of an output shaft of the motor and an outer peripheral surface of the exposed portion of the adapter column; and a rotation axis of the output shaft of the motor is parallel to a rotation axis of the liquid injection head and the adapter column.

14. The liquid injection device according to claim 1, further comprising a bearing and a sealing member located in the accommodating cavity, the bearing being configured to rotationally support the adapter column, and the sealing member being configured to form a sealing connection between the adapter column and the liquid injection body.

* * * * *